US005428469A

United States Patent [19]
Willett

[11] Patent Number: 5,428,469
[45] Date of Patent: Jun. 27, 1995

[54] LIQUID CRYSTAL DISPLAY PROJECTION SYSTEMS EMPLOYING POLARIZING BEAM SPLITTERS AND PASSING LIGHT THROUGH DISPLAY CELL FROM BOTH DIRECTIONS

[75] Inventor: Stephen J. Willett, St. Paul, Minn.

[73] Assignee: Minnesota Mining and Manufacturing Company, St. Paul, Minn.

[21] Appl. No.: 153,304

[22] Filed: Nov. 16, 1993

[51] Int. Cl.$^6$ .................. G02F 1/1335; G02F 1/03; G02B 5/30; G02B 21/14

[52] U.S. Cl. ...................... 359/41; 354/246; 354/495; 354/496; 354/629; 354/638; 359/496; 359/629; 359/638; 359/41; 359/42; 359/48; 359/49

[58] Field of Search ............ 359/41, 42, 48, 49, 359/246, 496, 495, 629, 638; 348/766, 790, 791, 761

[56] References Cited

U.S. PATENT DOCUMENTS

| | | | |
|---|---|---|---|
| 4,090,219 | 5/1978 | Ernstoff et al. | 348/742 |
| 4,127,322 | 11/1978 | Jacobson et al. | 353/31 |
| 4,500,172 | 2/1985 | Gagnon et al. | 359/41 |
| 4,647,966 | 3/1987 | Phillips et al. | 359/41 |
| 4,786,146 | 11/1988 | Ledebuhr | 359/66 |
| 4,826,311 | 5/1989 | Ledebuhr | 359/40 |
| 4,850,685 | 7/1989 | Kamakura et al. | 359/634 |
| 4,913,529 | 4/1990 | Goldenberg et al. | 359/63 |
| 4,917,464 | 4/1990 | Conner | 359/53 |
| 5,042,921 | 8/1991 | Sato et al. | 359/40 |
| 5,115,305 | 5/1992 | Baur et al. | 359/40 |
| 5,121,983 | 6/1992 | Lee | 359/464 |
| 5,172,222 | 12/1992 | Plantier et al. | 359/40 |
| 5,235,444 | 8/1993 | de Vaan | 359/40 |

FOREIGN PATENT DOCUMENTS

| | | |
|---|---|---|
| 0509630A2 | 10/1992 | European Pat. Off. . |
| 61-122626 | 6/1986 | Japan . |
| 4-120586 | 4/1992 | Japan . |
| 4-175744 | 6/1992 | Japan . |

Primary Examiner—William L. Sikes
Assistant Examiner—Kenneth Parker
Attorney, Agent, or Firm—Gary L. Griswold; Walter N. Kirn; Eric D. Levinson

[57] ABSTRACT

A liquid crystal display projection system for providing improved brightness. A light beam is split by a polarizing beam splitter into two polarized beams having substantially orthogonal polarizations. The beams are reflected by one pair of mirrors toward an opposite side of a liquid crystal display, so that the two beams pass through the display in opposite directions. The two beams are then reflected by another pair of mirrors toward another polarizing beam splitter, where the beams are recombined into a single beam for projection onto a screen.

14 Claims, 3 Drawing Sheets

LIQUID CRYSTAL DISPLAY PROJECTION SYSTEMS EMPLOYING POLARIZING BEAM SPLITTERS AND PASSING LIGHT THROUGH DISPLAY CELL FROM BOTH DIRECTIONS

FIELD OF THE INVENTION

The present invention relates generally to projection systems, and more particularly to projection systems employing liquid crystal displays.

BACKGROUND OF THE INVENTION

Liquid crystal display (LCD) projection systems offer the advantages of large image areas, compactness, ease of setup, light weight, and low cost compared with competing technologies. An LCD is comprised of thousands of small picture elements, or "pixels", which are either "on", "off", or "partially on". An image is displayed by the LCD by the appropriate manipulation, usually by applying an electric field, of the individual pixels. In the case of a twisted nematic (TN) LCD, if a particular pixel is "on", then the phase, and thus the polarization, of a linearly polarized light ray will remain unchanged as it passes through the pixel. However, if the pixel is "off", then the light ray will be rotated, i.e., its phase will be modulated so that its polarization angle is changed by 90 degrees. If the pixel is "partially on", then the light ray will be rotated by less than 90 degrees. An "on" pixel can be designated to represent either black or white. If the "on" pixel is designated as black, then the "off" pixel is designated as white, and vice versa. A "partially on" pixel represents a shade of gray. Polarizers are then provided on the LCD so that the polarization state of the light passing through the pixel is converted into the appropriate amount of transmission (black, white, or gray).

In the case of a super twisted nematic (STN) LCD, the optical effect arises from birefringence effects so that "on", "off", and "partially on" pixels each have a characteristic birefringence color. If the "blue mode" is used, the "off" pixel will have a blue color while the "on" pixel will be cream colored. If the "yellow mode" is used, the "off" pixel will be yellow and the "on" pixel will be blue-gray. A film may be added between the STN LCD and one of its polarizers to neutralize the color of the display, i.e., to convert the color display to a black and white display.

Presently, LCD projection systems suffer from low brightness compared to directly viewed cathode ray tube devices; e.g., televisions. It would be desirable to have an LCD projection system having improved brightness.

SUMMARY OF THE INVENTION

Accordingly, the present invention includes a method of projecting an image formed on a polarization-modulating display, such as an LCD. The method includes the steps of directing a light beam toward a beam splitting means, such as a polarizing beam splitter, which splits the beam into two beams having different, e.g., orthogonal, polarizations. The two beams are then directed, e.g., by mirrors, toward opposite sides of the display, and pass through the display in opposite directions. The two beams are then directed, e.g., by the same two mirrors, toward a beam combining means, which may be the polarizing beam splitter, which combines the beams for projection onto a viewing screen.

The present invention also includes the projection system that performs the method described above.

BRIEF DESCRIPTION OF THE DRAWING

FIG. 2 is a schematic view of the projection system of FIG. 1 when the pixels in the LCD are on.

DETAILED DESCRIPTION

Figure 1:
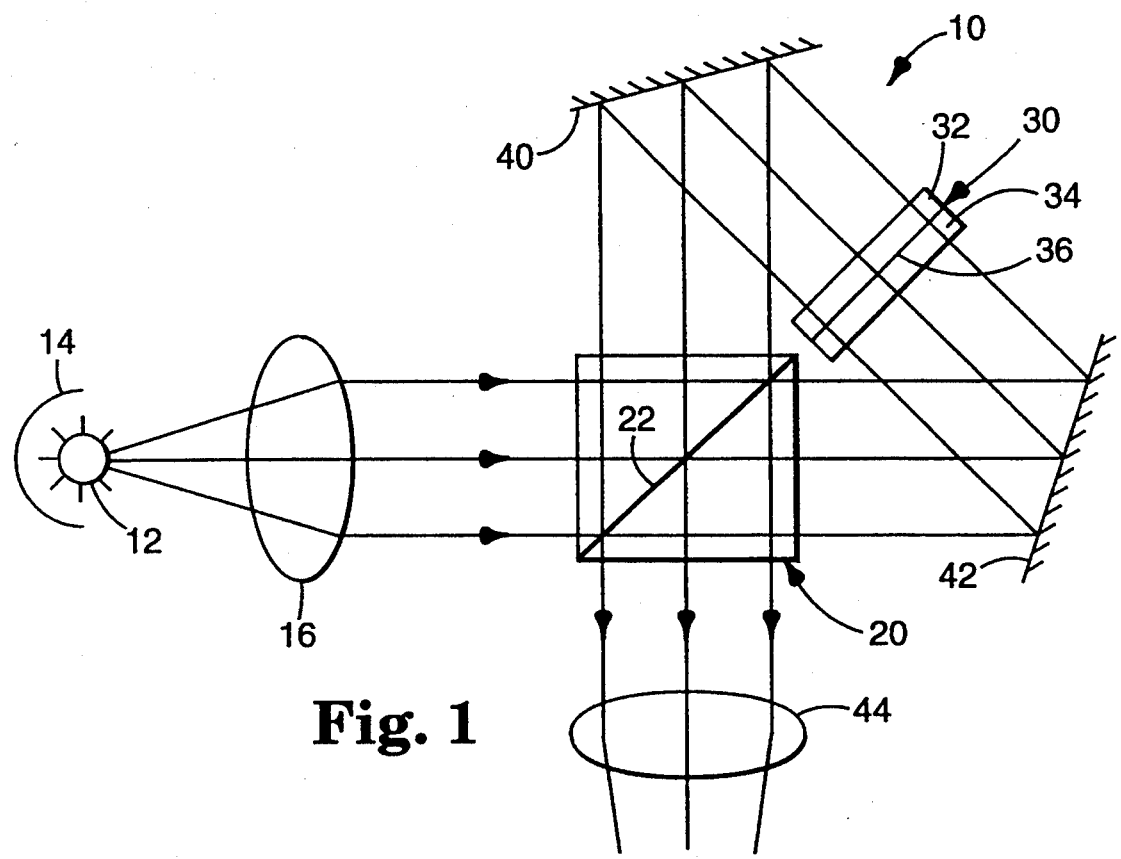
FIG. 1 is a schematic view of a projection system according to one embodiment of the present invention.

A liquid crystal projection system 10 according to the present invention is shown in FIG. 1. A light source 12 emits unpolarized light which is directed toward a collimating lens 16 with the help of a reflector 14. The light from light source 12 is then collimated by lens 16 and directed toward a polarizing beam splitter 20. Polarizing beam splitter reflects light of one polarization at face 22 while transmitting light having a polarization substantially orthogonal to the other polarization.

The light which is reflected at face 22 of polarizing beam splitter 20 is directed toward a mirror 40, where it is reflected toward a liquid crystal display 30. Liquid crystal display 30 is comprised of transparent substrates 32 and 34 having an array of pixels 36 provided between them. The light beam passes through liquid crystal display 30 and on toward mirror 42, where it is reflected back toward polarizing beam splitter 20. Portions of the light beam are then either reflected at face 22 of beam splitter 20 or are transmitted through the beam splitter, depending on which pixels are on, off, or partially on, as will be explained later with reference to FIGS. 2 and 3. Portions of the light that are reflected will be directed toward a projection lens 44 for projection onto a viewing screen (not shown). Portions of the light that are transmitted will continue back toward lens 16, light source 12, and reflector 14, where they may be recycled back toward beam splitter 20 by the reflector, thereby increasing the brightness of an image formed on the viewing screen for a given power of the light source.

The light which is not reflected at face 22 (which has a polarization substantially orthogonal to the beam that is reflected) is transmitted through beam splitter 20 toward mirror 42, where it is reflected toward liquid crystal display 30. The light beam then travels through liquid crystal display 30 and on toward mirror 40, where it is reflected back toward beam splitter 20. Thus, the light beam which is originally transmitted through polarizing beam splitter 20 passes through LCD 30 in the opposite direction as the light which is originally reflected at face 22 of the beam splitter. Portions of the light beam are then either transmitted through beam splitter 20 or reflected at face 22 of the beam splitter, depending on which pixels are on, off, or partially on. Portions that are transmitted will continue on to projection lens 44 for projection onto the viewing screen. Portions that are reflected will be directed toward lens 16, where they may be recycled back toward beam splitter 20 by reflector 14.

LCD 30 should be positioned between mirrors 40 and 42 so that the optical path length between the LCD and projection lens 44 are equal regardless of whether the light rays pass through the LCD in one direction and are reflected by mirror 40 or pass through the LCD in the other direction and are reflected by mirror 42. This ensures that the images formed by both sets of light rays will be in focus on the viewing screen.

Figure 2:
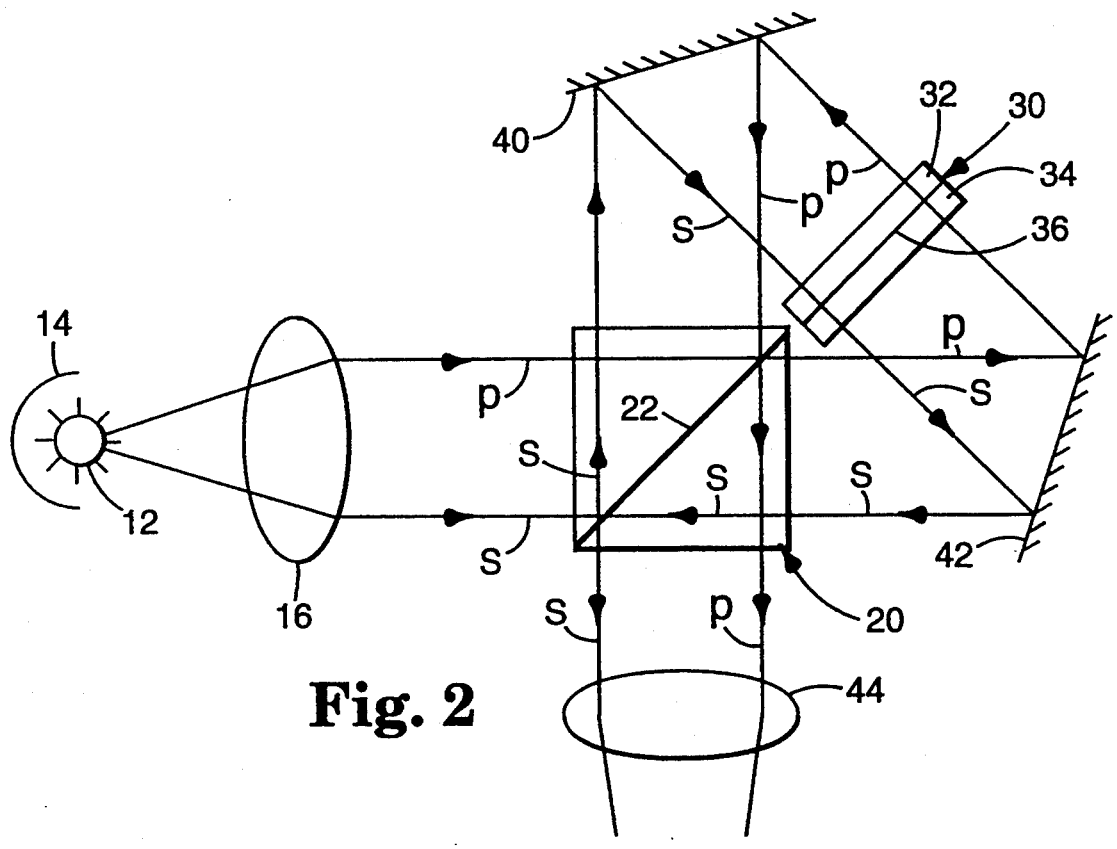
Figure 3:
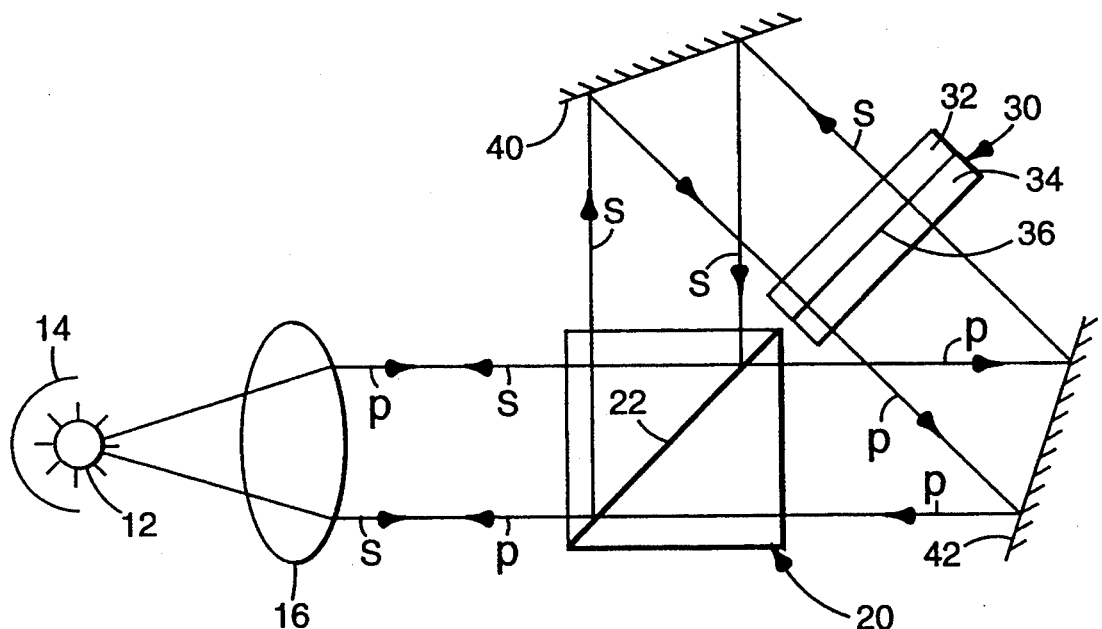
FIG. 3 is a schematic view of the projection system of FIG. 1 when the pixels in the LCD are off.

The manner in which an image formed on LCD 30 can be projected onto a screen is more clearly illustrated in FIGS. 2 and 3. For the purposes of the present discussion, it will be assumed that LCD 30 is a TN type (direct, multiplex, or active matrix addressed).

In FIG. 2, an electric field has been applied to pixels 36 of LCD 30, thereby turning the pixels "on". As explained earlier, when pixels 36 are in the "on" state, they do not affect the polarization state of light passing through them in either direction.

Light emitted from light source 12 is unpolarized, and can therefore be said to be comprised of s-polarized light and p-polarized light. By definition, the polarization state of p-polarized light and s-polarized light is oriented orthogonally (90°) with respect to each other. As illustrated in FIGS. 2 and 3, s-polarized light has its polarization parallel to face 22 of polarizing beam splitter 20. Face 22 of polarizing beam splitter 20 is designed to reflect s-polarized light while transmitting p-polarized light.

As illustrated in FIG. 2, light from light source 12 is unpolarized and thus comprised of both s-polarized and p-polarized light. The s- and p-polarized light rays are shown in FIGS. 2 and 3 as separate rays for the purposes of illustration only. The s-polarized light is reflected at face 22 of beam splitter 20 and directed toward mirror 40, while the p-polarized light is transmitted through the beam splitter toward minor 42. The s-polarized light is then reflected by mirror 40 toward LCD 30, while the p-polarized light is reflected by mirror 42 toward the opposite side of the LCD.

When pixels 36 are in the "on" state, the polarization state of light passing through them in either direction is unaffected. Thus, the s-polarized light remains s-polarized as it passes through LCD 30, and the p-polarized light remains p-polarized as it passes through the LCD in the opposite direction.

The s-polarized light is then reflected by mirror 42 back toward beam splitter 20, where it is reflected at face 22 toward projection lens 44 for viewing on a screen. The p-polarized light is then reflected by mirror 40 back toward beam splitter 20, where it is transmitted toward projection lens 40 for viewing on the screen. Beam splitter 20, mirrors 40 and 42, and LCD 30 must be properly oriented so that the s- and p-components of the light passing through a particular "on" pixel 36 are projected to the same position on the screen.

In FIG. 3, no electric field has been applied to pixels 36 of LCD, thereby turning the pixels "off". As explained earlier, when pixels 36 are in the "off" state, light passing through them in either direction is rotated by 90° so that its polarization angle is changed by 90°. Thus, p-polarized light becomes s-polarized, and vice versa. As illustrated in FIG. 3, unpolarized light, comprised of s-polarized light and p-polarized light, is emitted by light source 12. As in the case of FIG. 2, s-polarized light is reflected at face 22 of beam splitter 20 while the p-polarized light is transmitted through the beam splitter. And as in the case of FIG. 2, the s-polarized light is reflected by mirror 40 toward LCD 30 while the p-polarized light is reflected by mirror 42 toward the opposite side of the LCD.

However, as illustrated in FIG. 3, when the s-polarized light passes through pixels 36 of LCD 30 in the "off" state, the s-polarized light is rotated 90°, and thereby converted to p-polarized light. Similarly, the p-polarized light passing through "off" pixels 36 in the opposite direction is converted into s-polarized light.

The newly p-polarized light (formerly s-polarized) is then reflected by mirror 42 toward beam splitter 20. Because the light is now p-polarized, it passes through beam splitter 20 and back toward light source 12. Thus, the newly p-polarized light is not projected onto the screen, which is appropriate since pixels 36 are in the "off" state. The newly p-polarized light may, however, be reflected by reflector 14, or absorbed and re-emitted by light source 12, thereby recycling the unused p-polarized light, and thereby increasing the effective illumination power of the light source for any given power rating of the light source.

Similarly, the newly s-polarized light (formerly p-polarized) is then reflected by mirror 40 toward beam splitter 20. Because the light is now s-polarized, it is reflected at face 22 of beam splitter 20 back toward light source 12. Thus, the newly s-polarized light is not projected onto the screen, which is appropriate since the pixels 36 are in the "off" state. The newly s-polarized light is, however, reflected by reflector 14, thereby recycling the unused s-polarized light, and thereby increasing the effective illumination power of light source 12 for any given power rating of the light source.

Thus, one advantage of the present invention is that s-polarized and p-polarized light which passes through "off" pixels, and therefore is not projected on the screen, is not merely wasted but is instead partially recycled within the projection system.

The description given above implies that projection system 10 is operating in the "normally black" (NB) mode, i.e., a particular pixel will be black if no voltage potential is applied across it. System 10 can be converted to the normally white (NW) mode by the insertion of a half-wave retarder. The retarder can preferably be placed on either side of LCD 30, or either of the sides of polarizing beam splitter 20 facing mirrors 40 and 42. The retarder should have its fast and slow axes at 45° to the s- and p-polarization directions.

Figure 4:
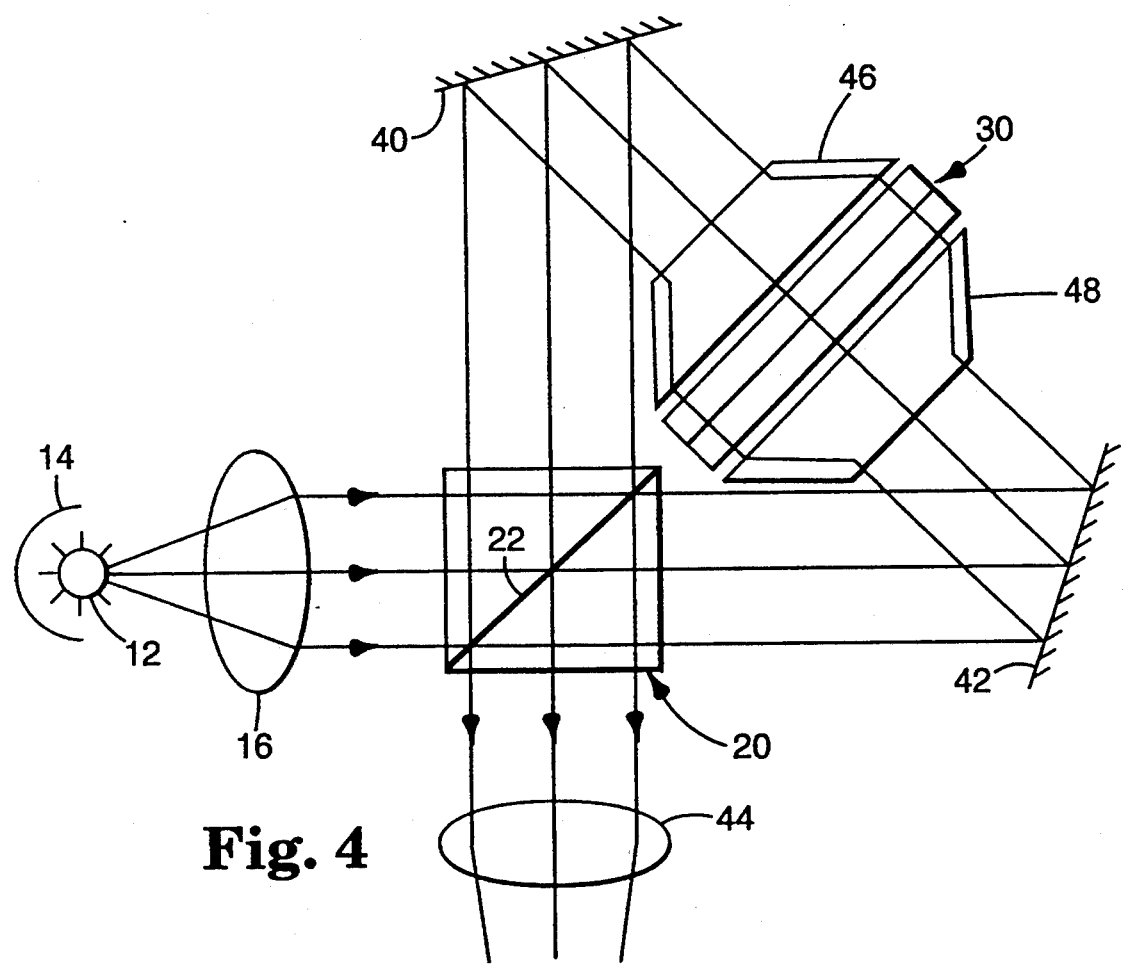
FIG. 4 is a schematic view of a projection system according to an alternative embodiment of the present invention which employs beam expanders.

An alternative embodiment of the present invention is shown in FIG. 4. The embodiment shown in FIG. 4 differs from that of FIG. 1 in that beam expanders 46 and 48 are provided on both sides of LCD 30. Beam expanders 46 and 48 may be provided adjacent LCD 30, as shown in FIG. 4. In the alternative, the optical elements which comprise beam expanders 46 and 48 may be repositioned within the projection system as necessary. Beam expanders 46 and 48 allow the projection system to operate with an LCD which has a larger area than the cross-sectional area of the beam splitter. This allows for the use of a smaller beam splitter (e.g., about 5 cm along the diagonal) with a larger LCD (e.g., about 9 cm along the diagonal).

Figure 5:
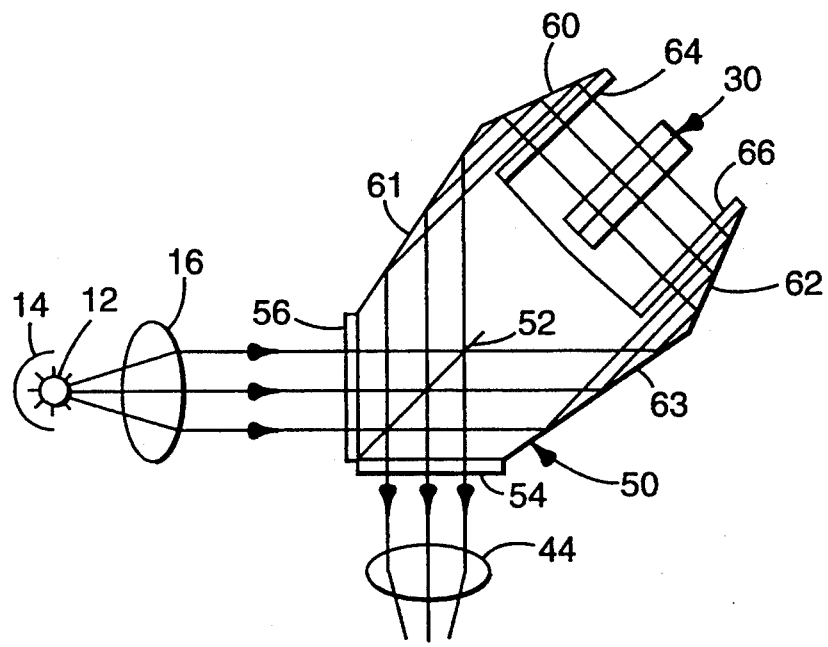
FIG. 5 is a schematic view of a projection system according to a second alternative embodiment of the present invention which employs total internal reflection.

Another embodiment of the present invention is shown in FIG. 5. The embodiment shown in FIG. 5 differs from that of FIG. 1 in that beam splitter 20 and mirrors 40 and 42 have been replaced with an optical element 50. Optical element 50 acts as a polarizing beam splitter (because of face 52) and also directs the polarized beams between the beam splitter face and LCD 30.

Optical element 50 minimizes light loss within the projection system by the use of total internal reflection of the light within the optical element. The light is reflected to and from LCD 30 by sides 60, 61, 62, and 63 of optical element 50. Loss of light within the projection system can be minimized by providing anti-reflection coatings 54, 56, 64, and 66 on the surfaces of optical element 50 through which light enters.

This embodiment is also advantageous in that the rigidity of optical element 50 avoids the potential for misalignment which may occur in the embodiment shown in FIG. 1 where mirrors 40 and 42 are not rigidly fixed to polarizing beam splitter 20. This embodiment, however, has the disadvantage of being heavier and costlier than the embodiment shown in FIG. 1.

The embodiments according to the present invention shown in FIGS. 1-5 are advantageous because they eliminate the need for providing separate polarizers on both sides of the LCDs. Such polarizers remove unwanted components of the source light, and therefore also reduce the amount of light passing through the LCD, thereby reducing the brightness of the projected image. These polarizers typically remove at least about one-half of the light incident on them.

The use of the polarizing beam splitter in the present invention eliminates the need for the separate polarizers and allows both polarization components of the light to be used, instead of using only one and discarding the other. This nearly doubles the efficiency of the projection system, thereby doubling the brightness of the image formed by it.

In addition, because separate polarizers allow for the transmission of only about one-half of the light, they typically absorb the other half, which can result in the heating-up of the polarizers. This increase in temperature of the polarizers is typically dealt with by providing a fluid circulation system, which typically uses a gas, such as air, or a liquid to cool the polarizers. Such circulation systems can take up needed space within the projection system and are a drain on the system power supply. Furthermore, air cooling systems can be noisy, and liquid cooling systems can be expensive. Because the projection system of the present invention does not use separate polarizers and wastes very little of the available light, the amount of light available to heat the system is minimized. This allows the size and power requirements of the circulation system to be kept at a minimum.

The approximately two-fold brightness improvement of the present invention is further enhanced by the recycling of unused light described earlier. Light which impinges an "off" pixel is eventually reflected back toward reflector 14, where it may be reflected back into projection system 10. On the next pass, the light might impinge an "on" pixel that is used to direct light onto the screen, thereby increasing the brightness of the screen image over that which would be present without the recycled light. Note that this light, originating only from the dark pixels of the image, is seldom considered a candidate for reuse in brightness enhancing techniques. The amount of the increase depends both on the geometry of the projection system and the content of the image or the LCD. Unlike other light recycling schemes in the prior art, this does not require the added expense of a quarter-wave retarder.

Light source 12, reflector 14, and collimating lens 16 preferably provide collimated light. Preferred light sources include a metal halide high intensity discharge (HID) lamp or a tungsten halogen lamp.

Polarizing beam splitter 20 is preferably a broad band cube having anti-reflection coatings on four of its faces, such as a one inch cube #BB1 available from Meadowlands Optics, Longmont, Colo., or cube #10 FC16PB.3, available from Newport/Klinger, Irvine, Calif., both of which cover the entire visible spectrum (400 nm to 700 nm). Mirrors 40 and 42 can be first surface metal mirrors, broad band dielectric mirrors, or any other type of mirror. Most pre-manufactured LCDs have polarizers provided on both of their sides. If such pre-manufactured LCDs are used, these polarizers must be removed. Although the LCD 30 has been described above as being a TN type, other types of LCDs can be used, such as ferroelectric (FE) LCDs, Super Twisted Nematic (STN) LCDs, or Triple Super Twisted Nematic (TSTN) LCDs. STN and TSTN LCDs may require the addition of a retardation plate. The brightness of the LCD may also be enhanced by providing microlens arrays on both sides of the LCD to increase the amount of light passing through the pixels, as is known in the art.

Figure 6:
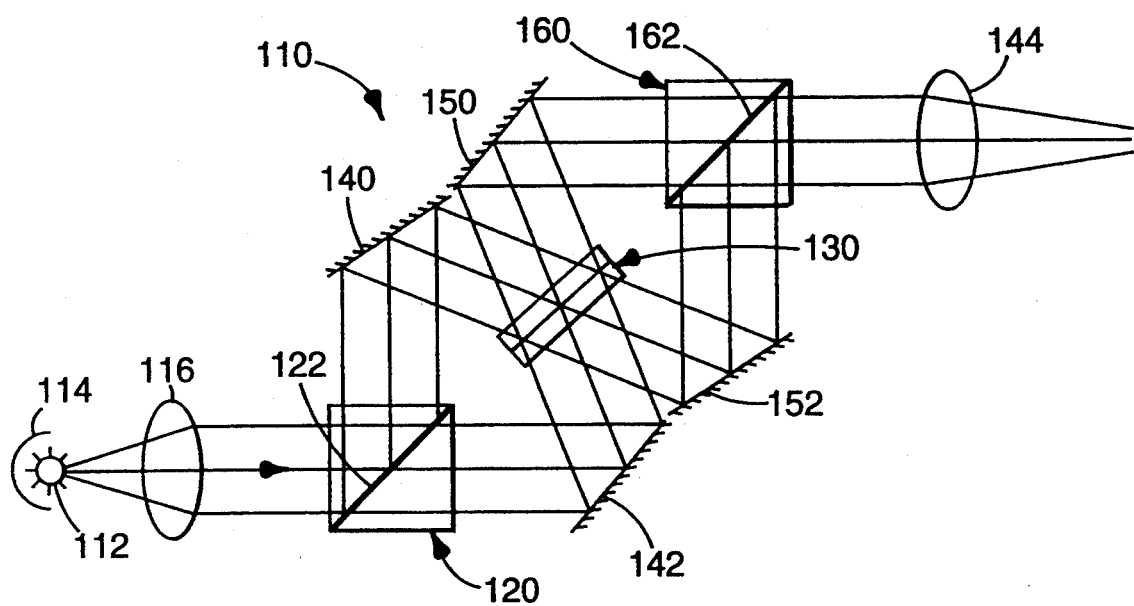
FIG. 6 is a schematic view of a projection system according to a third alternative embodiment of the present invention.

Another embodiment of a liquid crystal projection system according to the present invention is shown as projection system 110 in FIG. 6. In this embodiment, however, the unused light is not recycled back into the system. A light source 112 emits unpolarized light which is directed toward a collimating lens 116 with the help of reflector 114. The light from light source 112 is then collimated by lens 116 and directed toward a polarizing beam splitter 120. Polarizing beam splitter reflects light of one polarization at face 122 while transmitting light having a polarization substantially orthogonal to the other polarization.

The light which is reflected at face 122 of polarizing beam splitter 120 is directed toward a mirror 140, where it is reflected toward a liquid crystal display 130. The light beam passes through liquid crystal display 130 and on toward minor 152, where it is reflected toward a polarizing beam splitter 160. Portions of the light beam are then either reflected at face 162 of beam splitter 160 or are transmitted through the beam splitter, depending on which pixels are on, off, or partially on. The portions of the light that are reflected will be directed toward a projection lens 144 for projection onto a viewing screen (not shown).

The light which is not reflected at face 122 (which has a polarization substantially orthogonal to the beam that is reflected) is transmitted through polarizing beam splitter 120 toward mirror 142, where it is reflected toward LCD 130. The light beam then travels through LCD 130 and on toward mirror 150, where it is reflected toward beam splitter 160. Thus, the light beam which is originally transmitted through polarizing beam splitter 120 passes through LCD 130 in the opposite direction as the light which is originally reflected at face 122 of the beam splitter. Portions of the light beam are then either transmitted through beam splitter 160 or reflected at face 162 of the beam splitter, depending on which pixels are on, off, or partially on. The portions of the light that are transmitted will continue on toward projection lens 144 for projection onto the viewing screen.

The present invention also enhances the brightness of full color LCDs. LCD 30 can be provided with red, green, and blue (RGB) mosaic filters built within or atop the LCD. Such panels are available based on TN and neutralized STN technologies.

Another method of providing a color to the projected image is to use time-multiplexed color using a high speed black and white LCD. A revolving RGB filter wheel is provided in the optical path and the LCD is refreshed in synchrony with the position of the wheel. Although this has been difficult in the past because high resolution LCDs with 180 cycle/second refresh rates have been unavailable, the introduction of FE LCDs may make this idea practical.

LCD 30 could also be comprised of a registered stack of three LCDs with intervening polarizers, each layer removing one of the yellow-magenta-cyan (YMC) primary colors. The use of the collimated light described above is especially important in this case to avoid parallax in the pixels.

Another method of providing color is to split the original white light with a set of dichroic mirrors into three separate color beams, preferably red, green, and blue. These beams are then used to illuminate three separate LCDs which are modulated to give the respective color-separated images. A second set of dichroic mirrors recombines the red, green, and blue beams in imagewise registration for co-projection onto the screen.

In one embodiment there are three LCDs, each having a pair of reflecting mirrors positioned in a different plane. One dichroic mirror set lies between the polarizing beam splitter and one of the reflecting mirrors in each pair. The other dichroic mirror set lies between the polarizing beam splitter and the other of the reflecting mirrors in each pair. The components should be arranged so that the optical path lengths for each of the red, green, and blue beams from the polarizing beam splitter to the first set of dichroic mirrors, to one of the reflecting mirrors in each pair, through the LCD, to the other of the reflecting mirrors in each pair, and finally to the second set of dichroic mirrors, are equal. Furthermore, all three LCDs should be in the exact center of their respective optical paths described in the previous sentence.

Although the present invention has been described by reference to specific embodiments, those skilled in the art will recognize that the present invention is not limited to those embodiments. For example, polarizing beam splitter 20 can be any means for splitting a beam into two beams having substantially orthogonal polarizations. The two light beams can be recombined by the same polarizing beam splitter or by a separate means for recombining the beams. Although the two polarizations have been described as linear polarizations, the invention can have utility with any two substantially orthogonal polarizations, such as right hand circularly polarized and left hand circularly polarized light. Although the display has been described as an LCD, the invention has utility with any polarization-modulating display.

I claim:

1. A method of projecting an image formed on a polarization-modulating display, comprising the steps of:
    directing a first beam of light toward a beam splitting means;
    splitting the beam into second and third beams having substantially orthogonal polarizations;
    reflecting the second and third beams toward opposite sides of a polarization-modulating display with a first pair of mirrors;
    passing the second and third beams through the display in opposite directions; reflecting the second and third beams toward a beam combining means with a
    second pair of mirrors; reunifying the second and third beams into a fourth beam with the beam combining means; and projecting the fourth beam toward a screen.

2. The method of claim 1, further comprising: the step, before passing the second and third beams through the display, of
    expanding the second and third beams; and the step, after passing the second and third beams through the display, of
    condensing the second and third expanded beams.

3. The method of claim 1, further comprising two additional polarization-modulating displays and polarizers provided on the display, thereby forming a stack of three displays, with intervening polarizers, stacked in registration, wherein each display removes one of the yellow-magenta-cyan primary colors, whereby a color image may be projected on the screen.

4. The method of claim 1, wherein the display is a liquid crystal display, and further comprising the steps of directing light originating from the first beam toward a red-green-blue filter wheel, revolving the filter wheel, and refreshing the display in synchrony with the position of the wheel, whereby a color image may be projected on the screen.

5. The method of claim 1, wherein the display is a liquid crystal display, and further comprising the steps, after reflecting the second and third beams toward the display, of passing the second and third beams through a revolving red-green-blue filter wheel and refreshing the display in synchrony with the position of the wheel, whereby a color image may be projected on the screen.

6. A liquid crystal display projection system comprising:
    a light source for emitting a beam of light;
    means for splitting the light beam into second and third polarized beams having substantially orthogonal polarization;
    a liquid crystal display;
    a first pair of mirrors for reflecting the second and third beams toward opposite sides of the liquid crystal display;
    a second pair of mirrors for reflecting the second and third beams toward a beam combining means; and
    reunifying the second and third beams into a fourth beam with the beam combining means; and
    means for projecting the single beam onto a screen, whereby an image formed on the liquid crystal display can be projected onto the screen.

7. A method of projecting an image formed on a polarization-modulating display, comprising the steps of:
    directing a first beam of light toward a polarizing beam splitter provided in an optical element;
    splitting the beam by the use of the polarizing beam splitter into second and third beams having substantially orthogonal polarizations;
    internally reflecting the second and third beams off the surfaces of the optical element toward opposite sides of a polarization-modulating display;

passing the second and third beams out of the optical element;

passing the second and third beams through the display in opposite directions;

passing the second and third beams back into the optical element;

internally reflecting the second and third beams off the surfaces of the optical element back toward the polarizing beam splitter;

reunifying the second and third beams into a fourth beam by the use of the polarizing beam splitter;

passing the fourth beam out of the optical element; and projecting the fourth beam toward a screen.

8. The method of claim 7, wherein the steps of passing the second and third beams in and out of the optical element further comprise passing the second and third beams through anti-reflection coatings provided on the optical element.

9. A liquid crystal display projection system, comprising:

a light source for emitting a beam of light;

means for splitting the light beam into two polarized beams having substantially orthogonal polarizations, said means having a first cross-sectional area;

a liquid crystal display having a second cross-sectional area larger than the first cross-sectional area;

means for directing the polarized beams to pass through the liquid crystal display in opposite directions;

means for reunifying the polarized beams into a single beam;

means for directing the polarized beams toward the beam reunifying means;

means for expanding the beam of light as it passes from the beam splitting means to the liquid crystal display; and means for projecting the single beam onto a screen, whereby an image formed on the liquid crystal display may be projected onto the screen.

10. The system of claim 9, wherein the beam expanding means comprises first and second beam expanders provided on opposite sides of the liquid crystal display.

11. The system of claim 10, wherein the beam reunifying means is the beam splitting means.

12. A method of projecting an image formed on a polarization-modulating display, comprising the steps of:

directing a first beam of light toward a beam splitting means;

splitting the beam by the use of the beam splitting means into second and third beams having substantially orthogonal polarizations;

directing the second and third beams toward opposite sides of a polarization-modulating display;

expanding the second and third beams before passing them through the display;

passing the second and third expanded beams through the display in opposite directions;

condensing the second and third expanded beams after passing them through the liquid crystal display;

directing the second and third beams back toward a beam combining means;

reunifying the second and third beams into a fourth beam with the beam combining means; and projecting the fourth beam toward a screen.

13. The method of claim 12, wherein the beam combining means is the beam splitting means.

14. A method of enhancing the brightness of a projection of an image formed on a polarization-modulating display by recycling unused light, comprising the steps of:

directing a first beam of light from a light source toward a beam splitting means;

splitting the beam by the use of the beam splitting means into second and third beams having substantially orthogonal polarizations;

directing the second and third beams toward opposite sides of a polarization-modulating display;

passing the second and third beams through the display in opposite directions;

directing the second and third beams back toward a beam combining means;

splitting the second and third beams into fourth and fifth beams with the beam combining means;

projecting the fourth beam toward a screen to display the image;

directing the fifth beam back toward the light source and a reflector positioned behind the light source; and reflecting a portion of the fifth beam back toward the beam splitting means, thereby recycling unused light and enhancing the brightness of the image projected on the screen.

* * * * *